I. EMRICH.
BRACELET.
APPLICATION FILED MAR. 26, 1908.
907,980.
Patented Dec. 29, 1908.
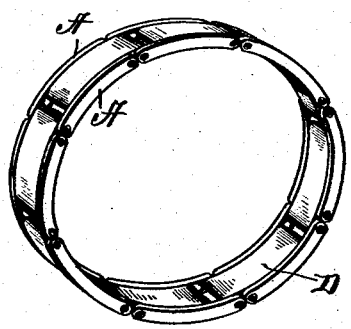
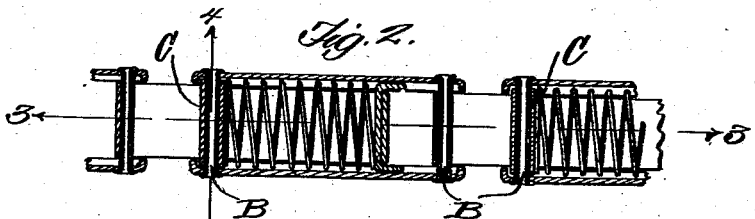
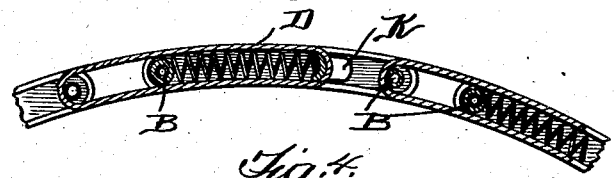
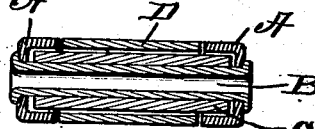
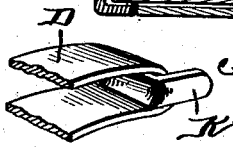
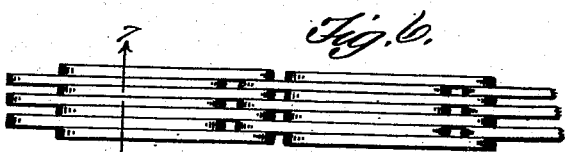
Witnesses
Inventor
I. Emrich,
By Franklin H. Hough
Attorney

UNITED STATES PATENT OFFICE.

ISIDOR EMRICH, OF PFORZHEIM, GERMANY.

BRACELET.

No. 907,980.

Specification of Letters Patent.

Patented Dec. 29, 1908.

Application filed March 26, 1908. Serial No. 423,402.

*To all whom it may concern:*

Be it known that I, ISIDOR EMRICH, a subject of the Emperor of Germany, residing at Pforzheim, in the Duchy of Baden, Germany, have invented certain new and useful Improvements in Bracelets; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in endless chain bracelets so arranged that the chain will expand under the influence of springs and contract drawing the links back to their normal positions after the bracelet is slipped over the hand and upon the wrist of the wearer, and comprises various details of construction, combinations and arrangements of parts which will be hereinafter fully described, and then specifically defined in the appended claims.

My invention is illustrated in the accompanying drawings, which, with the letters of reference marked thereon, form a part of this application and in which:—

Figure 1 is a side elevation of my improved bracelet. Fig. 2 is a sectional view through one of the links and a portion of a second link connected thereto. Fig. 3 is a cross sectional view on line 3—3 of Fig. 2. Fig. 4 is a sectional view on line 4—4 of Fig. 2. Fig. 5 is a detail perspective view of a portion of one of the links. Fig. 6 is a detail of a modification, and Fig. 7 is a section on line 7—7 of Fig. 6.

Reference now being had to the details of the drawings by letter, A—A designates two parallel bars of a link, which bars are grooved or U-shaped on cross section, and B designates a tubular pin which is connected at its ends in any suitable manner with the ends of said bars A. The ends of said tubular pins are preferably clenched against the marginal edges of the apertures in the bars A, through which they pass, and C designates a tubular pin about the pins B holding the bars A—A spaced apart.

D—D designate links which are of oblong shape and each made of a single band of metal with the opposite longitudinal edges open and a space intervening between the opposite walls of each link D sufficient to receive the tubular pins C.

F is a flat coiled invisible spring which is mounted between a pin C and the opposite wall of a link D, abutting on the sides against the grooved walls of links A—A. The purpose of said spring is to normally hold the chain in its contracted form or smallest diameter and allowing the chain to expand for the purpose of allowing a hand to be inserted therethrough to bring the bracelet upon the wrist or removing the bracelet therefrom. Projecting from the corresponding ends of the links D are the lugs K which have a play within the grooved bars A and serve to hold the adjacent ends of the links spaced apart. It will be noted that the opposite faces of the links D and the edges of the grooved bars A are flush with each other, and the opposite faces in parallel plane making a smooth surface without obstruction.

While I have described a particular construction of tubular pins which connect the grooved bars, it will be understood that any other form of pin may be utilized equally as well, if desired, for holding the grooved bars spaced apart.

From the foregoing, it will be noted that, by the provision of a bracelet made of an endless chain as shown and described, a simple and efficient device is afforded whereby the chain may be expanded to allow the hand of a wearer to be inserted therethrough or removed from the wrist and hand, the springs causing the links of the chain to come together or contract and comfortably fitted about the wrist of the wearer.

What I claim to be new is:—

A bracelet comprising an inner and outer series of links, cylindrical posts connecting said outer links, each of the outer links being flanged, a cylindrical roller mounted upon each post and extending within the flanges of the outer links, the inner links having open sides and having bearings upon said cylindrical rollers and held thereby so that the outer surfaces of the inner series of links and the outer faces of said flanges will be flush, and a coil spring extending about each link of the inner series and extending within and adapted to bear against the inner longitudinal surfaces of side links, as set forth.

In testimony whereof I hereunto affix my signature in the presence of two witnesses.

ISIDOR EMRICH.

Witnesses:
  CARL W. SCHMITT,
  WALTER A. LEONARD.